US006629887B1

(12) United States Patent
Todaiji et al.

(10) Patent No.: US 6,629,887 B1
(45) Date of Patent: Oct. 7, 2003

(54) GAME DEVICE USING GAME TOKEN

(75) Inventors: Mitsuru Todaiji, Tokyo (JP); Susumu Murata, Tokyo (JP); Makoto Tanaka, Tokyo (JP); Katsumi Kobayashi, Tokyo (JP); Tetsuya Hamada, Tokyo (JP); Kazuhiro Hagino, Tokyo (JP); Takashi Semuna, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/438,530

(22) Filed: Nov. 12, 1999

(30) Foreign Application Priority Data

Nov. 13, 1998 (JP) .......................................... 10-324093

(51) Int. Cl.[7] ............................................... G06F 17/00

(52) U.S. Cl. .......................... 463/2; 273/359; 273/402; 193/44; 453/3

(58) Field of Search ............................. 463/2; 273/369, 273/138.1, 358; 193/28, 44, 47; 453/5, 3, 9, 32

(56) References Cited

U.S. PATENT DOCUMENTS 2,623,803 A * 12/1952 Gamble ......................... 86/46
3,587,804 A * 6/1971 Marenco ...................... 193/43
5,031,911 A * 7/1991 Okada
5,071,127 A 12/1991 Bromley et al. .............. 273/85
5,417,435 A * 5/1995 Peretz ........................ 273/355
5,445,376 A * 8/1995 Bromley ..................... 273/108
5,462,286 A * 10/1995 Roberts ...................... 273/459
5,636,639 A * 6/1997 Turturro et al. ............. 600/564
5,704,837 A * 1/1998 Iwasaki et al. ................ 463/2
5,888,115 A * 3/1999 Shoemaker et al. ........ 446/168
5,951,015 A * 9/1999 Smith et al. ................ 273/358
5,967,892 A * 10/1999 Shoemaker, Jr. ............ 273/448
5,971,849 A * 10/1999 Falciglia ..................... 273/292
6,071,192 A * 6/2000 Weiss ..................... 273/143 R
6,092,807 A * 7/2000 Yu .......................... 273/138.1
6,165,063 A * 12/2000 Perkitny ........................ 453/9
6,206,370 B1 * 3/2001 Halliburton .............. 273/138.1
6,309,299 B1 * 10/2001 Weiss .......................... 463/20

OTHER PUBLICATIONS

The Dot Eaters, http:///www.emuunlim.com/doteaters/pla2sta2.htm.*
Examiner's Affidavit.*

* cited by examiner

*Primary Examiner*—Valencia Martin-Wallace
*Assistant Examiner*—Corbett B. Coburn
(74) *Attorney, Agent, or Firm*—Finnegan, Henderson, Farabow, Garrett & Dunner, L.L.P.

(57) ABSTRACT

Provided is a game device using game tokens with a newly added element not found in conventional game devices. In the present token game device, the token game processing system and the video game processing system are linked. That is, the processing of the video game in the satellite unit (2) is commenced in accordance with whether or not a token hit the target (3). The processing contents of the video game are altered in accordance with the player's operation of the lever (23). Then, tokens are paid out to the player in accordance with the processing results of such video game. Therefore, the player is able to enjoy various operations, and provided is a game in which the player will not lose interest.

20 Claims, 12 Drawing Sheets

GAME DEVICE USING GAME TOKEN

FIELD OF THE INVENTION

The present invention generally relates to a so-called token-shooting game or token-dropping game, wherein a player discharges a game token from the token-discharging unit to hit a target. The present invention particularly relates to a novel game service using game tokens with an additional element of amusement added to the element of a game wherein a player attempts to hit the target with an actual game token.

DESCRIPTION OF THE RELATED ART

Token-shooting games and token-dropping games (hereinafter collectively referred to as a"token game device") are games wherein a player attempts to hit a moving target with a game token, which is equivalent to live ammunition, by operating a token-discharging unit.

A typical conventional token game device comprises a structure wherein the degree of the token hitting the target is converted to scores, and the game results are set in accordance with the light/low accumulation of such scores. In the field of pachinko game devices, there are types wherein a display unit is provided at the center thereof, and a game such as a slot machine is automatically operated with a computer when balls or tokens enter the pockets. In these devices, similar to a token game device, the player's operation is limited to the determined by the player's operation, and the results thereof, i.e., prizes, are supplied (paid out) to the player as tokens or balls.

To determine whether a target is hit in a token game device, a structure is required for receiving and detecting a discharged token reaching a prescribed area. A typical example of this type of token-detecting method is a token-detecting mechanism using a plurality of sensors similar to those provided in a vending machine. This token-detecting mechanism detects the movement and direction of movement of the coin with a plurality of sensors, and is capable of preventing fraudulent acts such as the recollection of coins using a string. In order to produce a jackpot, which corresponds to a special prize in a token game device, a jackpot unit capable of paying out tokens is rotated on the turntable together with the moving target. Conventionally, tokens discharged toward the target were collected at the token supplier fixed to the lower part of the target. Therefore, when it was necessary to supply tokens to the jackpot unit, the turntable was temporarily stopped in order to supply the tokens.

On the other hand, with respect to sound, a typical conventional token game device synthesizes the discharging sound of tokens to inform the player that a token has been discharged and background music produce an entertaining feeling characteristic for a game. The sound may be output from speakers.

Nevertheless, conventional token game devices have several problems. Foremost, if tokens are merely discharged to hit the target in order to obtain scores as with conventional game devices, this is no better than a shooting game at a festival, and players today who are familiar with video games may lose interest in the game. Combining a slot machine game with a token game device as with many of the pachinko game devices, however, is not suitable for players of token game devices. Many of the pachinko players expect stimulation of the speculative spirit in the structure of the game in order to win prizes. In contrast, players of token game devices tend to enjoy the operation of the game itself, and do not endeavor only to win a lot of tokens. Thus, such players prefer a structure wherein the operational element is abundant and the game itself may be enjoyed. Nonetheless, since a player will be confused if there are numerous operational elements and observational items, simply adding a video game thereto will not solve the aforementioned problems.

With respect to the targets in the token game device, it is not necessary to consider the possibility of fraudulent acts since merely detecting the existence of the discharged token will suffice. Preferred is a simple structure capable of reliably detecting the passing of a token. Furthermore, stopping the turntable only for the mere purpose of supplying tokens results in the interruption of the game, which is not preferable.

With respect to sound, there is a problem in that a discharging sound and background music may conflict with each other. That is, if there is no discharging sound, the player will not be able to confirm that the token has been discharged and he/she will not be able to feel the actual sensation of playing the game. Background music has the purpose of gathering prospective users by producing an enjoyable atmosphere of the game, but some of the users tend to sidestep games employing such discharging sound. These users do not prefer shooting games and will not play a game just by hearing the discharging sound of bullets. Unlike the aforementioned shooting games, a token game possesses an element for everybody to participate and enjoy, and therefore, sound which will allow such aforementioned users to participate in the game is required.

SUMMARY OF THE INVENTION

In light of the aforementioned problems, the inventors of the present invention aimed at providing a novel token game device unlike the conventional game devices.

In other words, an object of the present invention is to provide a token game device wherein a player will not lose interest in the game.

Another object of the present invention is to provide a token game device enabling various operations such that the player may enjoy such operations.

Still another object of the present invention is to provide a token game device allowing game play in cooperation with another player.

A further object of the present invention is to provide a token game device comprising an inexpensive token-detecting mechanism suitable for token games.

A still further object of the present invention is to provide a token game device capable of supplying tokens without stopping the movement of the target.

A yet further object of the present invention is to provide a game device having sounds suitable for both gathering prospective users and game play.

In order to achieve the aforementioned objectives, the present invention is a token game device in which a player attempts to hit a target with a game token, comprising: processing means for commencing the processing of a video game in accordance with whether or not the token hit the target; alteration means for altering the processing contents in accordance with the player's operation; and decision means for deciding the prize to be awarded to the player in accordance with the processing results of the video game.

Here, a "token" shall not be limited to discord items such as coins but shall include other items as well since it is merely a game medium. For example, a "token" shall not be limited to the shape of a ball, block, medal, etc. Moreover, a "token" may be a physically independent item as well as a bundle of energy such as light and (super) sonic waves, and shall include situations wherein a target is aimed at with the likes of a laser gun. A "token" further includes conceptual items that do not exist in reality. In other words, this would include a structure which judges whether or not a discharging unit is facing the target by detecting the direction of such discharging unit with the likes of a sensor and, when the discharging unit is correctly facing the target and conducts a discharging motion, considers that a bullet has been discharged in light of the computer processing. A "target" is an object aimed at with a token and is not required to be physically existent; for example, it may be the likes of an image that does not exist in substance. A "hit" shall mean a direct physical contact as well as a situation where the target and token are in a prescribed relationship, for example, such as when they are in close distance. A "prize" shall include the payout of actual tokens as well as the likes of conceptual points and acquisition of the right to replay a game.

In order to achieve the aforementioned objects, the present invention is a token game device in which a player attempts to hit a target with a game token, comprising: a discharging unit for discharging a token in accordance with the player's operation; a target for detecting the hit of the token; an operation unit to be operated by a player; a display unit for displaying images of the video game; a payout unit for paying out to the player tokens corresponding to the prize; and a control unit for generating images for the video game and commencing the game processing of the video game when it is judged that the token hit the target, wherein the control device alters the processing contents in accordance with the player's operation of the operation unit and pays out tokens to the player in accordance with the results of the game processing.

Here, "display unit" shall include image displayable means such as a crystal panel, plasma display and CRT. The expression "commencement of game processing" shall include the situation of actually starting the game from the beginning as well as when the processing contents are altered such as when a character, which is already displayed, starts shooting bullets.

For example, the control unit is capable of executing:

a first game which moves a first object corresponding to a weapon toward a second object corresponding to an enemy when it is judged that a token hit the target, and which eliminates the second object when it is judged that the first object collided with the second object; and a second game which displays on a screen a third object corresponding to a prize when a prescribed condition is fulfilled in the first game, and which pays out tokens in correspondence with the number of third objects a player was able to collide with his/her operation of a fourth object set to be movable in correspondence with the player's operation.

Here, "object" shall mean objects to be displayed as an image, such as models, characters and segments which simulate the movement of living or nonliving objects such as fighter planes, monsters, people, robots, cars, etc.

Furthermore, the control unit is structured such that a player may alter the expected value for eliminating the second object with his/her operation.

In order to achieve the aforementioned objectives, the present invention is a token game device in which a player attempts to hit a target with a game token, comprising: a plurality of discharging units respectively operable by a player; a plurality of display units for displaying images of a video game in correspondence with the discharging units; and a control unit for executing game processing of a video game per discharging unit in accordance with whether or not the tokens discharged from the respective discharging units hit the target, wherein, when a condition required for participating in a special game in at least one discharging unit is fulfilled, the control unit simultaneously executes the special game in the other discharging units, and executes the special game processing by combining the results of whether or not the tokens discharged from the respective discharging units hit the target.

The control unit may be structured to display the same object to the respective display units when executing the special game, and to be mutually reflective to a video game for displaying on the respective display units the results of whether or not the tokens discharged from the respective discharging units hit the target.

The control unit may further be structured to store in correspondence with the respective discharging units the results of whether or not the tokens hit the target during the execution of the special game and, upon the completion of the special game, decide the prize to be awarded to the player operating the respective discharging units in correspondence with the results stored therein.

As a specific example, the present invention is a token game device in which a player attempts to hit a target with a game token, comprising: a plurality of discharging units for discharging tokens in accordance with the player's operation; one or more targets for detecting the hit of the tokens; one or more display units for displaying images of a video game and which corresponds to one or a plurality of the discharging units; one or more operation units to be operated by a player and which corresponds to one or a plurality of the discharging units; one or more payout units for paying out tokens to a player and which corresponds to one or a plurality of the discharging units; and a control unit for executing the game processing of a video game and generating images of the video game per display unit. The control unit executes a first video game per display unit when it is judged that a token hit the target. The control unit then executes a second video game reflective of the operational contents of the operation unit when the processing contents of the first video game fulfill a prescribed condition, and pays out tokens to a player in accordance with the processing contents of the second video game. When a condition required to participate in a special game in at least one of the discharging units is fulfilled, the control unit simultaneously executes the special game in the other discharging units, decides the processing contents of the special game by combining the results of whether or not the tokens discharged from the discharging unit hit the target, and pays out tokens to a player in accordance with his/her contribution to the processing contents of the special game.

For example, it is preferable that the control unit displays objects simulating tokens on the display unit upon paying out tokens to the player. This enables the player to richly feel that he/she is receiving tokens even if the actual payout of such tokens is few.

For example, it is preferable that the payout unit is arranged so as to be able to pay out tokens from the payout return provided a prescribed distance away from the display face of the display unit, and pay out tokens from the payout return in approximate synchronization with the display of the objects on the display unit. This arrangement enables the player to feel an illusion that the tokens displayed on the screen are being dropped as actual tokens.

For example, it is preferable that the control unit executes the video game such that the period of game play with the discharging unit and the period of the video game or payout of tokens in the video game do not overlap. By avoiding the period in which the player is concentrating, the player's operation is not hindered, and the player therefore will not be confused.

For example, the control unit includes: a first controller for detecting whether or not a token hit the target; and a second controller provided respectively to one or a plurality of the discharging units and capable of executing a video game for the respective discharging units. Moreover, the first controller and the second controller are capable of two-way communication. The load of the complex processing of the present invention may be distributed, and distributed processing is suitable for carrying out the overall flow of the processing.

In order to achieve the aforementioned objectives, the present invention is a token game device in which a player attempts to hit a target with a game token, wherein the target includes: a cylinder having an inner wall for the token to pass through; a controller arranged to cut across the inner diameter of the cylinder and for controlling the orientation of the passing token to a prescribed range; and a detector arranged so as to be able to detect the passing of the token in which the orientation thereof has been controlled by the controller.

For example, the controller is arranged to cut across the central axis of the cylinder and the detector is capable of detecting the passing of the token in the extending direction of the controller and an approximate perpendicular direction to the central axis, and the inner diameter of the cylinder is set to be smaller than $\sqrt{2}$ of the smallest token diameter to pass the cylinder.

For example, the token game device comprises a control unit for judging the passing of a token pursuant to detection signals detected by the detector, wherein the control unit judges the passing of a token upon the detection signals changing from a stationary state and prohibits the detection of the passing of a token for a prescribed period thereafter.

In order to achieve the aforementioned objectives, the present invention is a token game device in which a player attempts to hit a target with a game token, comprising: a collection container for receiving tokens discharged from the periphery of the token game device toward the target; a token transportation mechanism for gathering and transporting the tokens discharged into the collection container; and a rotation mechanism for rotating the collection container and token transportation mechanism, wherein the collection container is inclined with respect to a level surface and has a bottom portion provided with a hole at the lowermost portion, and the token transportation mechanism is arranged so as to be able to gather and transport the tokens that are gathered at and dropped from the hole.

In order to achieve the aforementioned objectives, the present invention is a game device, comprising: a first playback unit capable of playing background music; and a second playback unit capable of playing back sound effects such as discharging sounds of tokens required for the game operation, wherein the sounding position of the sound effect played back by the second playback unit, in comparison to the sounding position of the background music played by the first playback unit, is arranged in the vicinity of the player.

DESCRIPTION OF THE PREFERRED EMBODIMENT

The preferred embodiment of the present invention is now explained with reference to the relevant drawings. The present embodiment relates to a token game device to be played simultaneously by a plurality of couples.

Overall Structure

Figure 1:
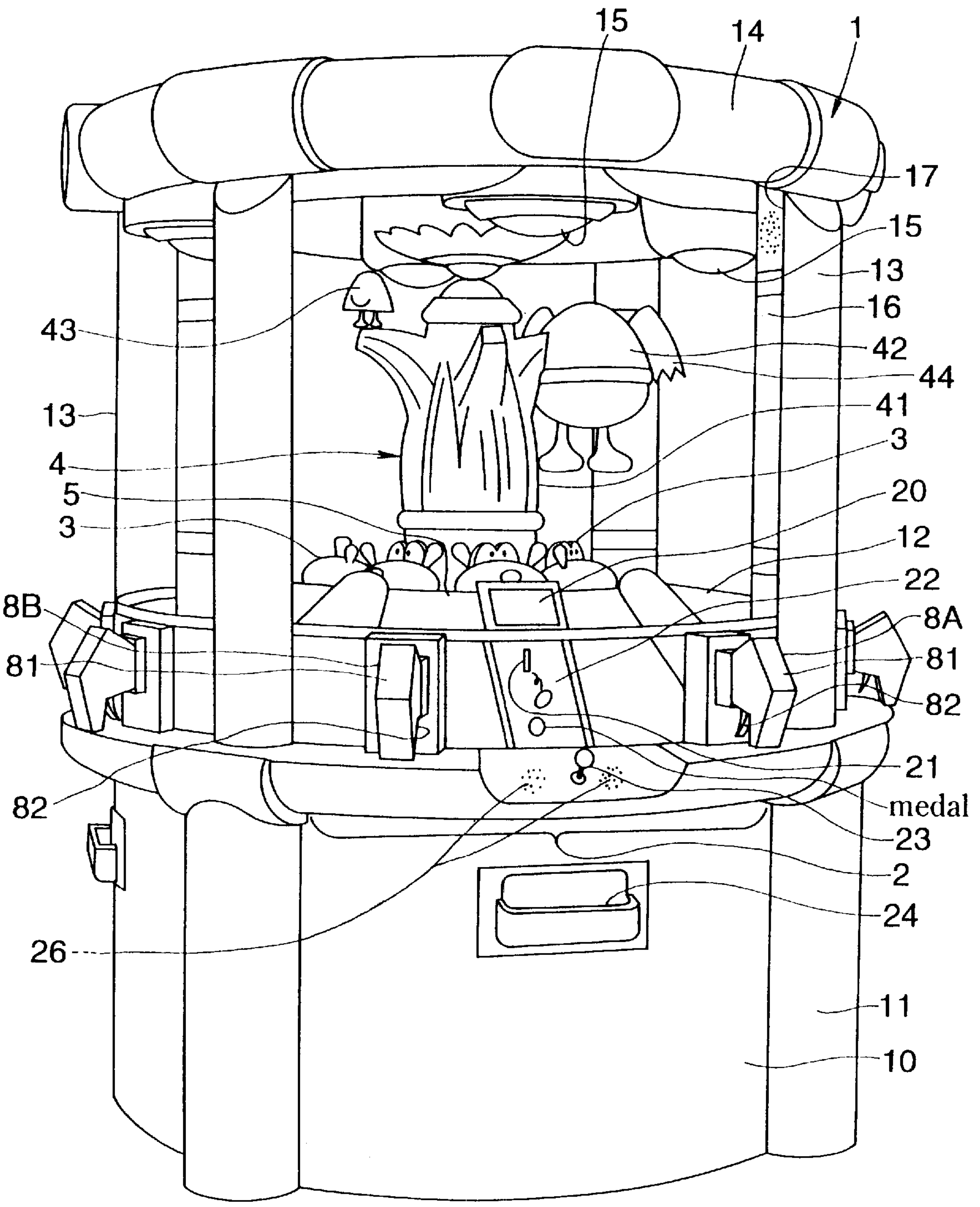
FIG. 1 is a perspective view of the token game device according to the present embodiment.

FIG. 1 is a perspective view of the token game device in the present embodiment. This token game device comprises a main body 1, satellite 2, target 3, jackpot 4, and turntable 5. The target 3 and jackpot 4 are surrounded by four satellites 2. The target 3 and jackpot 4 are structured to rotate simultaneously by the function of the turntable 5. Simply put, in this token game device, tokens can be discharged toward the target 3 from the discharging units 8A, 8B operated by the player, and a video game image is displayed on a display unit 20 when such discharged tokens hit the target 3.

The main body 1 comprises a maintenance door 10, lower pillar 11, cover 12, upper pillar 13, and ceiling 14. The maintenance door 10 is openably provided in correspondence to the respective satellites 2, and a payout return 24 for holding the paid-out tokens is provided thereto. The lower pillar 11 partitions the satellites 2 and is provided between the maintenance doors 10. The cover 12 hides the mechanism of the turntable 5 from the player, and is provided to be inclined toward the exterior of the token game device in order to collect the mishit tokens. The upper pillar 13 supports the ceiling 14 and is provided to partition the satellites 2. The space surrounded by the upper pillars and ceiling is the game space used for the token game device of the present invention. An illuminator 15 for illuminating the game space is provided to the ceiling 14, and an illuminator 16 also for illuminating the game space is provided to the inside of the upper pillar 13. A speaker 17 for playing background music is provided at the upper part of the upper pillar 13. A speaker 26 for outputting discharging sounds of tokens is provided in the vicinity of the lever 23 of the satellite 2. Although the speakers 26 are provided to the respective levers shown to the left and right of FIG. 1, only one speaker 26 may be provided to either the left or right lever. The speaker 26 may be arranged in an arbitrary position so as long as it is in the vicinity of the player and such player may clearly hear the sound thereof even if the volume is relatively small.

As the speaker 17 for playing background music is arranged at the upper part of the pillar, it is possible to efficiently play the background music to the surroundings and produce an enjoyable atmosphere of the token game device. The speaker 26 for outputting discharging sounds is structured independently such that the discharging sounds are not mixed with the background music. Therefore, players who dislike shooting games do not have to listen to the discharging sounds, and this increases the effect of gathering prospective users. The speakers 26 are established near the players simultaneously operating the discharging units 8A, 8B and it is therefore possible for the players to individually hear the discharging sounds. Thus, without difficulty, the players may play the game with rich ambience.

The respective satellites 2 are operable by two players. That is, it is possible for the players to play the game in pairs while cooperating with each other. Specifically, the satellite comprises a display unit 20, payout opening 21, payout passage 22, lever 23, and payout return 24. The display unit 20 displays images of a video game pursuant to the satellite unit 200 shown in FIG. 2. The payout opening 21 is the supply window where the tokens are paid out upon the player of the satellite 2 obtaining a good score. Particularly, this payout opening 21 is arranged in the vicinity of the display unit 20, namely, directly therebelow. By simultaneously displaying objects of tokens on the display unit and paying out the tokens from the payout opening, the player will be under the illusion that the tokens shown as images on the display are actually being paid out. Thus, the player will be provided with sufficient excitement of being paid tokens even if the actual number of tokens being paid out is small. The payout passage 22 has an inclined concave portion on its exterior, and enables the player to recognize the flow of tokens paid out from the payout opening 21. One lever 23 is provided to the satellite, and is operable by the player. This operation is reflected in the video game displayed on the display unit 20. The payout return 24 stores the tokens which passes through the payout passage 22, and the player is able to remove the tokens therefrom.

A plurality of targets 3 (eight in this embodiment) are provided and slowly rotate around the central axis of the token game device pursuant to the turntable 5. The detailed structure is explained later.

The jackpot 4 operates during the jackpot processing which corresponds to a special prize or a big hit, and is capable of paying out jackpot tokens. Particularly, the jackpot 4 comprises a main body 41 simulating trees, and a large character 42 and a small character 43. The large character 42 is provided with reciprocating wings 44, which move pursuant to a motor.

The turntable 5 rotates the target 3 and jackpot 4, and collects the discharged tokens. The detailed structure is explained later.

Discharging units 8A and 8B have the same structure, and comprise a main body 81 and a trigger 82. This discharging unit is capable of discharging, one at a time, discoid tokens toward the target 3 while interlocking with the operation of the lever 82 as per the methods disclosed in, for example, Japanese Patent Laid-Open Publication No. Sho 58(1983)-112572, Japanese Utility Model Laid-Open Publication No. Sho 59(1984)-53080, Japanese Patent Laid-Open Publication No. Hei 8(1996)-289970, and so on. A predetermined number of tokens are successively supplied to the discharging unit 8 from a token supplier not shown.

Structure of Target

Figure 3:
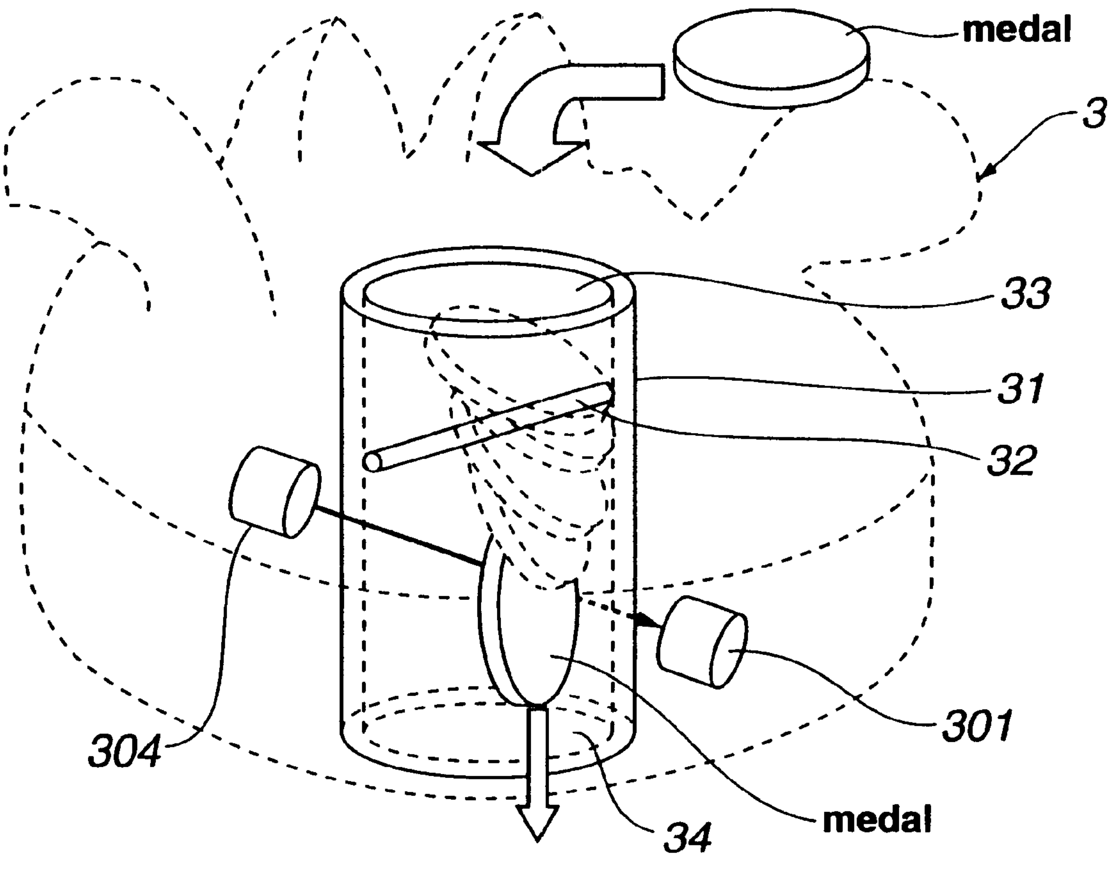
FIG. 3 is a perspective view explaining the internal structure of the target.
Figure 4:
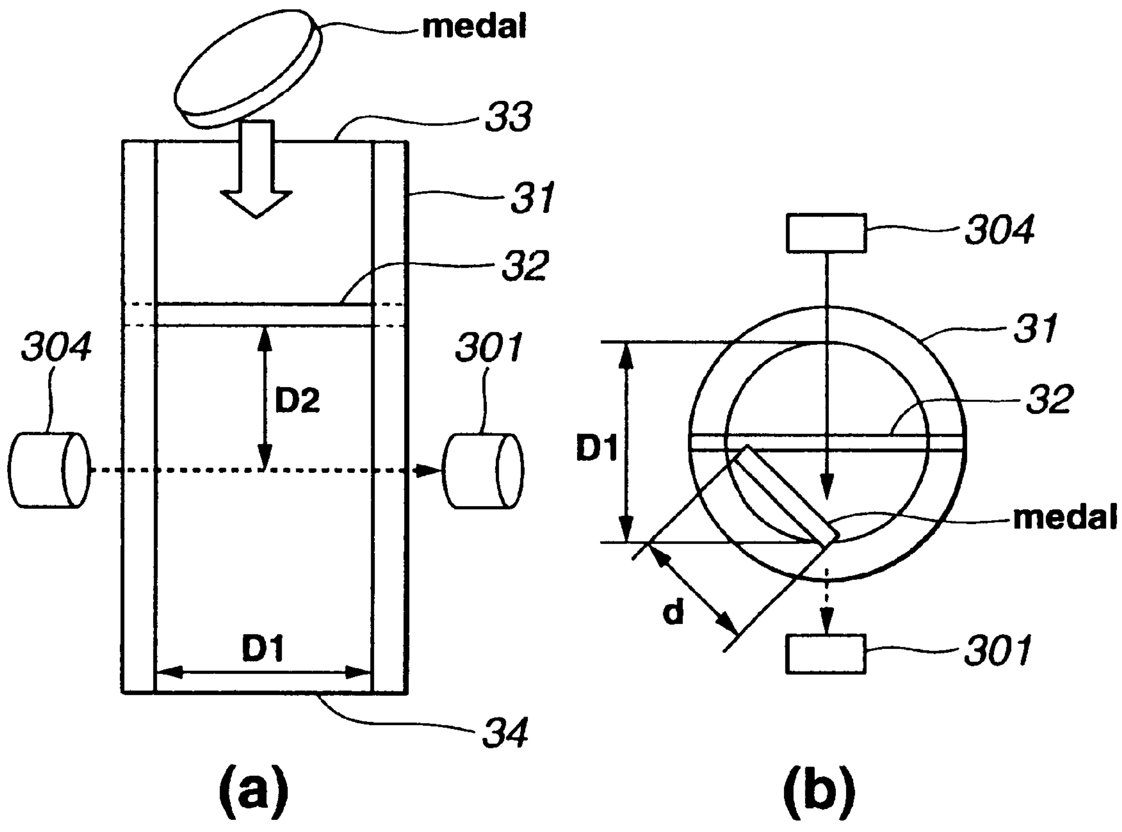
FIG. 4 is a front elevation (a) and top view (b) of the principle portions of the detection means of the target.

FIGS. 3 and 4 show the internal structure of the target 3. The target 3 is covered with a mold simulating a character, and a cylinder 31 is provided at the central portion thereof with its axial direction facing an approximate perpendicular direction. The upper part of the mold is formed of a concave portion having a hole in the center, and tokens entering from such upper part are guided from such hole to the cylinder 31. In other words, if a token enters such hole (i.e., a hit), the token passes through the cylinder 31 and a hit is detected thereby. The cylinder 31 passes tokens having a diameter under a prescribed value from an opening 33 toward another opening 34, and a control rod 32 is mounted to cut across the central axis thereof. This control rod 32 comprises a function of arranging the direction of the tokens falling from the opening 33 to be within a prescribed range. The cylinder 31 is formed of material capable of permeating light, such as resin, and a luminescent element 304 and sensor 301 are provided under the control rod 32 in order to detect the existence of a cover. It is preferable that the extending direction of the control rod 32 and the detection line connecting the luminescent element 304 and the sensor 301 are set to be at a right angle.

As shown in FIG. 4, when the token with the smallest diameter is d1 (not shown), the token with the largest diameter is d2 (not shown), and the inner diameter of the cylinder is D1, the diameter of the token d and said D1 are set forth in order to satisfy the following relationship:

$$29\ \sqrt{2}19\ d1>D1>d2$$

If the inner diameter d1 of the cylinder 31 is smaller than the largest diameter d2 of the discharged token, such token will not be able to pass through the cylinder. Moreover, when the detection line and control rod are at a right angle, the size of the token that will cross the detection line without fail is when the angle made by the token face and the control rod is smaller than 45°. Thus, when the angle made by the token face and the control rod is 45°, 29 $\sqrt{2}$ of the token diameter d will be equivalent to the inner diameter of the cylinder, and the aforementioned relationship is satisfied. The distance D2 between the detection line of the sensor 301 and the control rod 32 shall be set to a distance in which the orientation control may be completed for making the token face perpendicular, as much as possible, to the detection line. For example, the distance D2 may be set to a distance similar to the token diameter.

In the aforementioned structure, when the token enters the inside of the cylinder 31 and reaches the position of the control rod 32, unless the token face is parallel with the perpendicular direction, a part of the token will come in contact with the control rod. When a part of the token contacts the control rod, as shown with the dashed lines in FIG. 3, the token is rotated. This force works to face the token face toward a perpendicular direction. Furthermore, if the token face makes a large angle with the extending direction of the control rod, the force works to restrain such angle to be smaller than 45°. As a result thereof, a token having a diameter satisfying the aforementioned condition will cut across the detection line without fail, and the passing of such token is detected.

Figure 5:
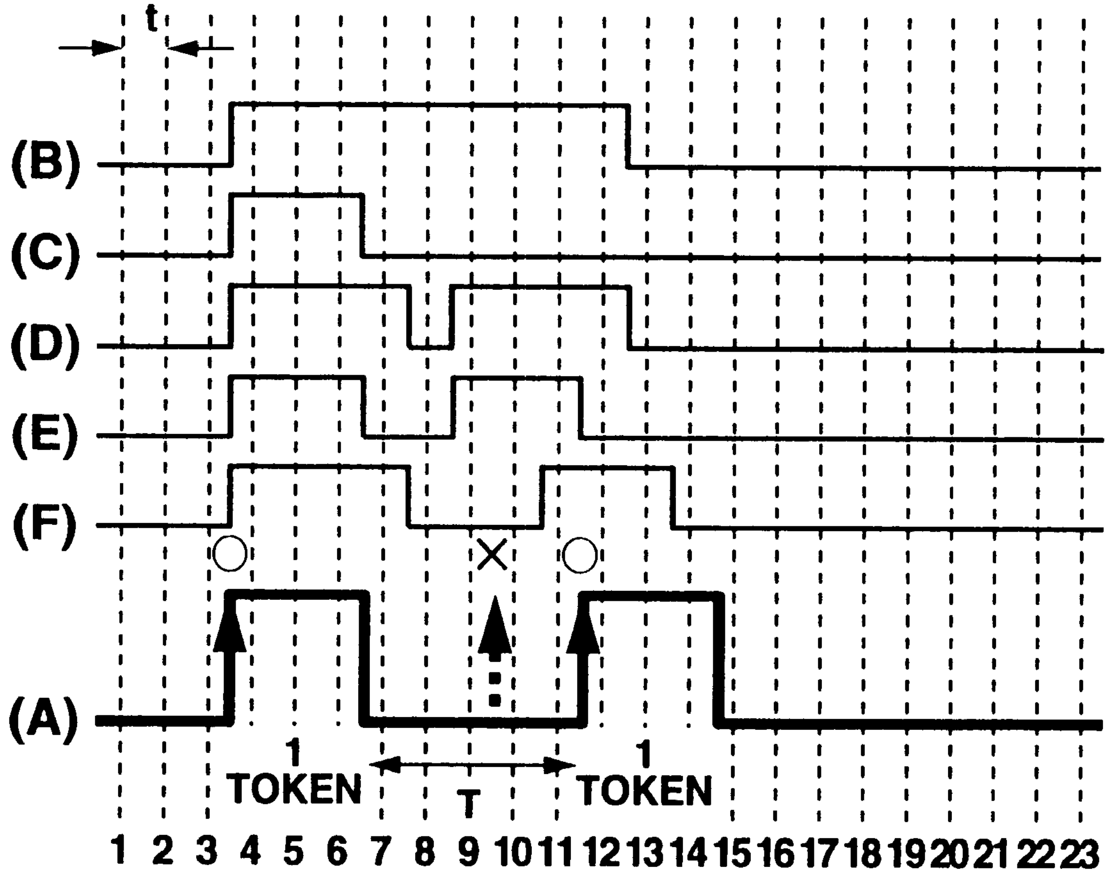
FIG. 5 is a timing chart explaining the detection signal and detection method of tokens.

FIG. 5 shows waveforrns (B) through (F) of the detection signals output from the sensor 301. Waveforms (B) and (C)

show that pulse widths differ when the obstruction period of the detection line differs in accordance with the diameter or direction of the token. Waveforms (D), (E), and (F) show that, when rotational force is provided to the token by the control rod 32, there may be cases when a plurality of pulses are generated by the same token cutting across a detection line a plurality of times within a short period. The detection circuit (existing within the board 302 of FIG. 2) in the present embodiment judges that one token passed through when the detection signal changes from a stationary state (L level) to an H level, and thereafter prohibits the detection of tokens for a prescribed period of time. For example, the detection circuit detects the detection signal status per prescribed sampling period (2 ms for example) and, when an H level is detected for a prescribed period (3 samplings for example) after an L level is detected for a prescribed period (3 samplings for example), judges that one token has passed through. The detection circuit thereafter prohibits the detection of status sufficient for disregarding the second pulse in waveforms (D) through (F) (10 ms for example). As shown in waveform (A) of FIG. 5, the detection circuit may be structured to detect the passing of the token with the transition of the pulse, and thereafter prohibit the detection of the transition for a prescribed period T. According to the aforementioned structure, it is possible to reliably detect the passing of tokens, inexpensively, with only one sensor.

Structure of Turntable

Figure 6:
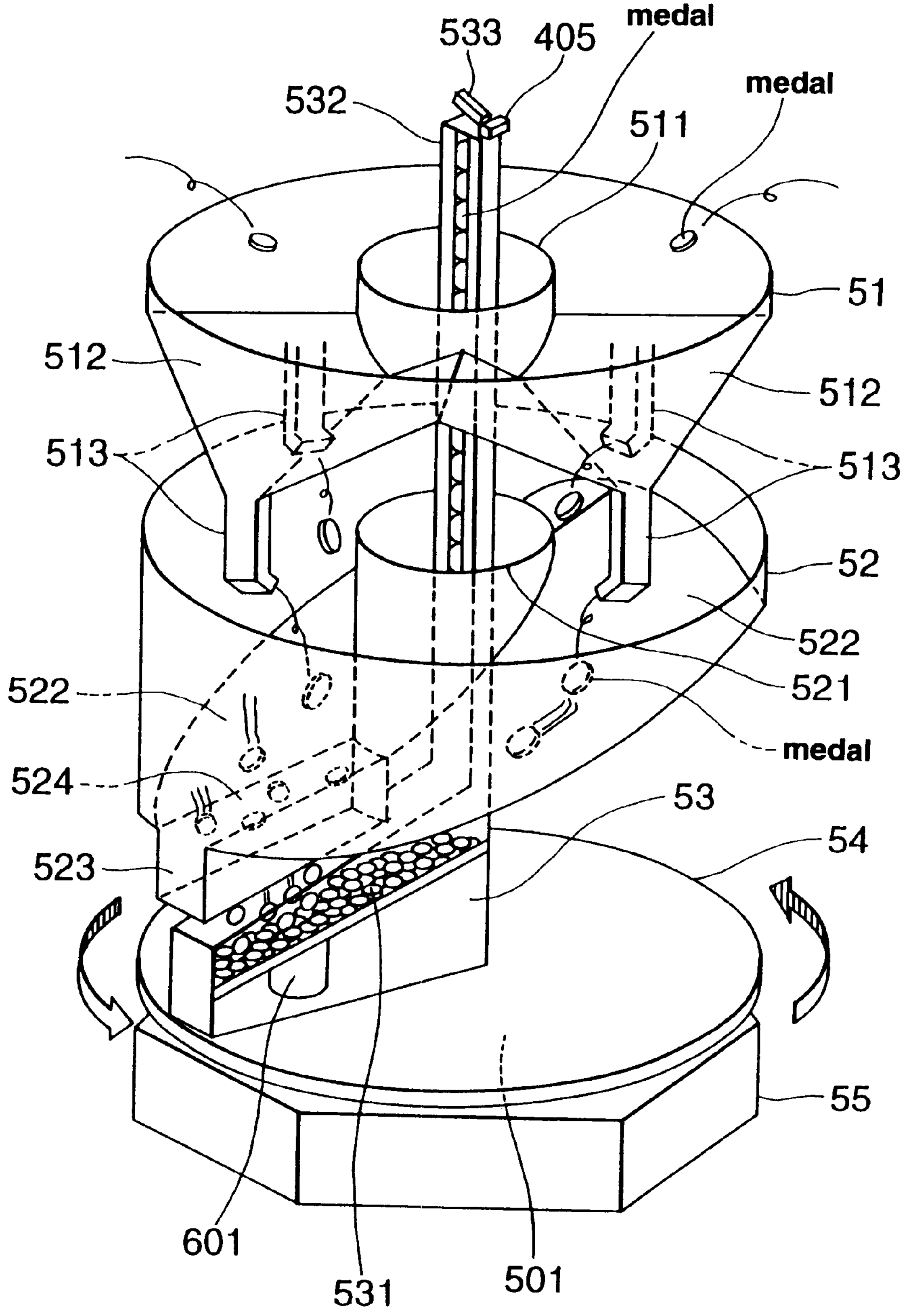
FIG. 6 is a perspective view explaining the structure of the turntable.

FIG. 6 is a perspective view showing the structure of the turntable 5. As shown in FIG. 6, the turntable 5 comprises a token receptacle 51, round chute 52, token supplier 53, rotation plate 54, and base 55. Excluding the token receptacle 51 and base 55, the aforementioned structural elements simultaneously rotate on the same rotational axis.

The token receptacle 51 is formed in a donut-shaped saucer comprising an opening 511. A beam not shown is placed thereover from the opening 511 to the outer periphery, and the target 3 is provided on such beam. A tapered bottom 512 capable of collecting the tokens discharged to the periphery of the target 3 is provided to the token receptacle 51. The lowermost portion of the bottom 512 opens, and is connected to the passage 513. According to this structure, tokens discharged into the token receptacle 51 will slide past the bottom 512 and exit from the passage 513. Moreover, the token receptacle is not a requisite element, and the token may directly fall into the round chute 52.

The round chute 52 is formed in a donut shape comprising an opening 521. The round chute 52 comprises a tapered bottom 522 inclined toward the opening 524 of the lowermost (deepest) portion thereof. A passage 523 is provided to the opening 524 for stabilizing the fall of tokens. With this structure, the tokens which fall into the round chute are gathered at a single location, namely the opening 524, and exit from the passage 523.

The token supplier 53 is capable of supplying tokens gathered by the round chute 52 to the jackpot 4. That is, the token supplier 53 comprises a token storage unit 531, token supplier motor 601, token guide 532, reciprocal lever 533, and count sensor 405. A token forwarding unit not shown is provided at the bottom of the token storage unit 531. The token forwarding unit is capable of successively forwarding tokens into the token guide 532 by rotating a disk-provided with a plurality of holes, wherein tokens may be inserted thereinto. The token guide 532 is a passage for the tokens and is capable of transferring the tokens in a single line for a long distance. When the tokens exit from the outlet of the token guide 532 and enter the jackpot unit, the reciprocal lever 533 reciprocates and the counter sensor 405 detects the exiting tokens in correspondence to such reciprocation. As the structure of such token supplier 53, known art disclosed in, for example, Japanese Patent Laid-Open Publication No. Hei 10(1998)-97669 and Japanese Patent Laid-Open Publication No. Hei 10(1998)-177666 may be employed.

The rotation plate 54 is capable of integrally rotating the token receptacle 51, round chute 52, and token supplier 53 by the motor 501 (not shown) provided to the base 55.

Structure of Control Block

Figure 2:
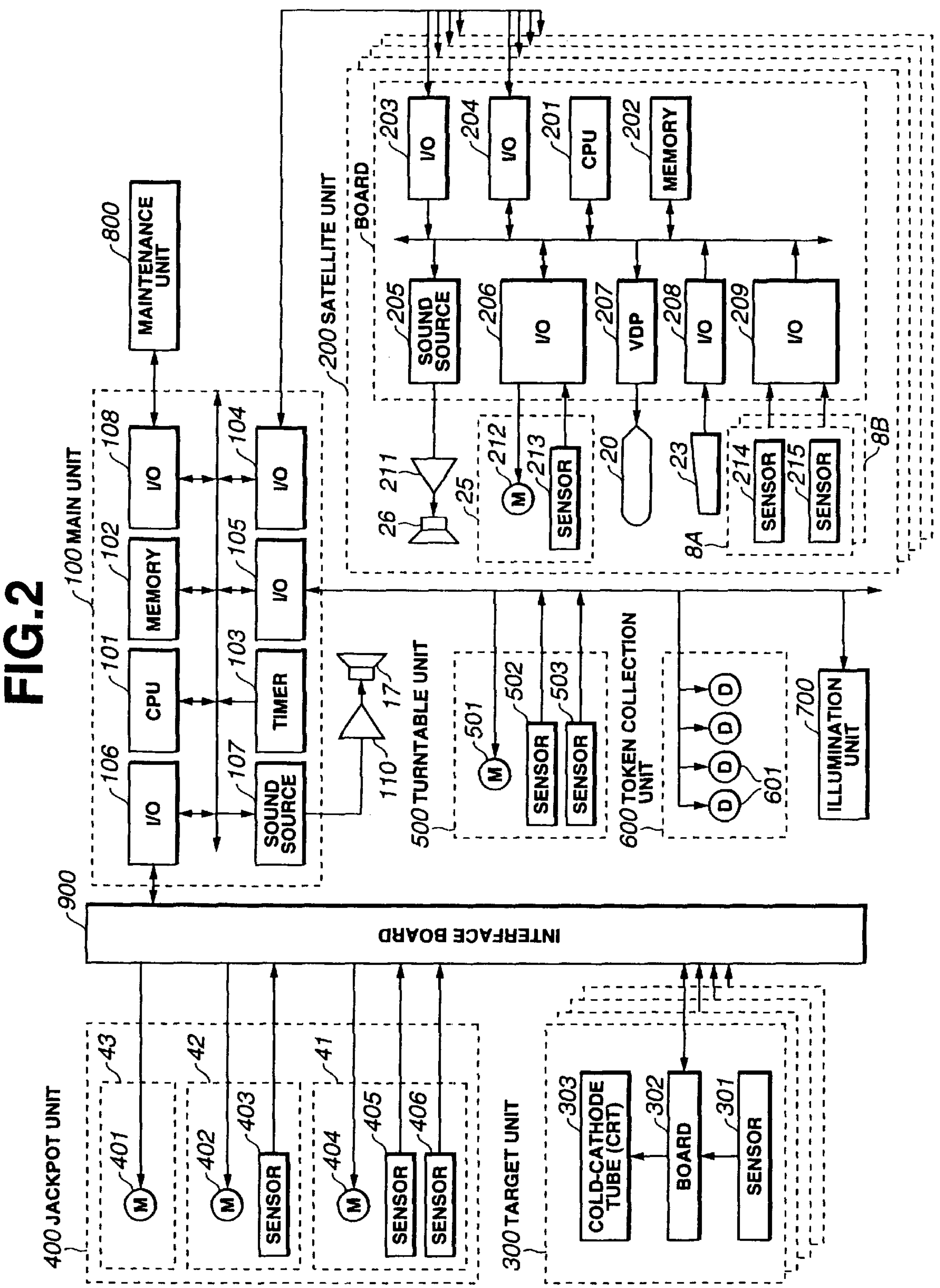
FIG. 2 is a system block diagram of the token game device according to the present embodiment.

FIG. 2 is a system block diagram for operating the token game device according to the present embodiment. As shown in FIG. 2, the system block comprises a main unit 100, satellite unit 200, target unit 300, jackpot unit 400, turntable unit 500, token collection unit 600, illumination unit 700, maintenance unit 800, and interface board 900. This system block is characterized in that the main unit 100, which is the first control unit, and a plurality of satellite units 200, which are secondary control units, are connected to enable two-way communication which allows for distributed processing.

The main unit 100 is capable of controlling the target unit 300, jackpot unit 400, turntable unit 500, token collection unit 600, illumination unit 700, and maintenance unit 800. The main unit 100 conducts the transmission/reception of data and commands with the respective satellite units 200. Particularly, the main unit 100 comprises a CPU 101, memory 102, timer 103, interface circuits 104,105, 106,108, sound circuit 107, and so on.

By executing the programs stored in the memory 102, the CPU 101 is able to execute the processing steps shown in FIGS. 7 through 11 as a part of the control unit of the present invention other than storing programs in its ROM portion, the memory 102 is capable of providing the RAM portion as the work area of the CPU. The timer 103 is capable of notifying the elapsed time by interrupting the CPU in prescribed intervals by dividing the crystal oscillator. The interface circuit 105 transmits motor activation signals to the turntable unit 500, drive signals to the token collection unit 600, and illumination instruction signals to the illumination unit 700, and receives detection signals of the position sensors 502, 503 from the turntable unit. To the jackpot unit 400 via the interface board 900, the interface circuit 106 outputs small character activation signals f or motor 401, large character activation signals for motor 402, and hopper activation signals f or motor 404 and inputs the detect ion signals of a large character 42 wave sensor 403, main body 41 count sensor 405, and full sensor 406. The interface circuit 106 further outputs illumination instruction signals and inputs sensor 301 detection signals to the respective target units 300. The interface circuit 108 inputs operation signals for the maintenance unit 800 and for maintenance. The sound circuit 107 has a built-in waveform memory, and synthesizes waveforms in accordance with the sound source control signals from the CPU and outputs the sound signals of the synthesized waveform. The sound signals synthesized with this sound source circuit are mainly related to background music. Sound signals are power amplified at the amplifier 110 and are provided to the speaker 107 mounted on the upper pillar 13 of the token game device main body 1.

The satellite unit 200 is provided in correspondence to the satellite 2 (four units in this embodiment), and exchanges data with the main unit 100 and controls the respective satellites 2. Particularly, the satellite unit 200 comprises on its board a CPU 201, memory 202, interface circuits 203, 204, 206, 208, 209, video display circuit 207 (VDP) and sound source circuit 205.

By executing the programs stored in the memory 202, the CPU 201 is able to execute the processing steps shown in FIGS. 8 through 10 and 12 as a part of the control unit of the present invention. The CPU 201 is particularly structured to execute the video game to be displayed on the display unit 20. Other than storing programs in its ROM portion, the memory 202 is capable of providing the RAM portion as the work area of the CPU. Interface circuit 203 conducts the transmission/reception of data and commands with the main unit 100, and interface circuit 204 receives sound source control signals. Interface circuit 206 outputs motor 212 activation signals to the hopper 25 which supplies tokens to the respective discharging units 8A and 8B, and inputs detection signals from the counter sensor 213. Interface circuit 207 inputs detection signals of the lever 23 and interface circuit 209 inputs detection signals from the token sensor 214 and trigger sensor 215. The video display unit 207 has a built-in data memory and frame memory, generates frame images pursuant to object data and position information designated by the command of the CPU 201 controlling the progress of the video game, and is capable of outputting picture signals to the display unit 20. The sound circuit 205 has a built-in waveform memory, and synthesizes waveforms in accordance with the sound source control signals from the CPU 201 and outputs the sound signals of the synthesized waveform. The sound signals synthesized with this sound source circuit mainly relate to the discharging sound of tokens and to the sound of the video game displayed on the display unit 20. Sound signals are power amplified at the amplifier 211 and are supplied to the speaker 26 mounted on the side of the lever 23 of the satellite 2.

The target unit 300 is a unit provided inside the target 3, and comprises the aforementioned sensor 301, board 302, and cold-cathode tube 303. Although not shown, the target unit 300 also comprises the luminescent element 304 shown in FIGS. 3 and 4. The board 302 inputs detection signals from the sensor 301, detects the passing of tokens with the aforementioned method of judgment, and outputs the detection to the CPU. The board 302 further comprises a circuit capable of flashing the cold-cathode tube 303 when it detects the passing of tokens, and illuminating the cold-cathode tube 303 in correspondence with the illumination control signals from the CPU. The cold-cathode tube 303 is arranged to surround the cylinder 301, and radiates light sufficient for illuminating the target 3 through its mold.

The jackpot unit 400 comprises a motor 401 for activating the small character 43, motor 402 for activating the large character 42, and motor 404 for activating the hopper within the main body 41. The jackpot unit 400 further comprises a sensor 403 for detecting the wing 44 movement of the large character 42, hopper count sensor 405, and full sensor 406. Motors 401 and 402 respectively move the characters in order to provide visual effects to the player. Motor 404 is an activation unit for paying out tokens upon jackpot processing. The sensor 403 detects the position of the wings 44 and reverses the motion of the motor 402 to make it look like the large character 42 is flapping its wings. The count sensor 405 calculates the number of paid-out tokens and the full sensor 406 outputs detection signals to stop further supply of tokens when the hopper is filled with tokens.

The turntable unit 500 is a control block of the turntable 5, and comprises a motor 501, jackpot sensor 502, and position sensor 503. Motor 501 is provided with a base 55 for rotating the rotation plate 54. The jackpot sensor 502 detects the position of token payout upon jackpot processing and stops the turntable thereby. The position sensor 503 is provided for each satellite 2, and specifies a target in correspondence to the respective satellites 2.

The token collection unit 600 comprises a token supplier 53 for jackpots, as well as a plurality of activation units 601 of the token collection unit not shown for supplying tokens to the discharging unit 8 of the respective satellites 2. The illumination unit 700 is a unit provided with illuminators 15, 16 for illuminating the game space. The maintenance unit 800 is a unit provided with a maintenance reset switch, power-on switch, test selection switch, sound volume knob, etc. The interface unit 900 comprises an interface mechanism for electrically connecting the rotating target unit 300 and jackpot unit 400 with the stationary main unit 100.

Operation

The operation of the token game device according to the present embodiment is explained below.

Overall Flow

When a player starts a game, an ordinary game is commenced. In the ordinary game processing, a player operates the discharging unit 8 and attempts to hit the target 3 with tokens. The player may play the game in cooperation with a partner and use two discharging units therefor. When a token hits a target, a video game is commenced on the display unit 20 of the satellite 2 corresponding to the player who hit the target. The content of the video game, for example, may be a scene wherein the bullet fired form a character destroys an enemy character. When a certain number of enemy characters are destroyed, energy points, which are player points per satellite, are added, and the first stage is completed.

When a player completes a prescribed number of stages, the boss battle begins. When a boss battle begins in any one of the satellites 2, the ordinary game being executed in the other satellites is temporarily interrupted, and the boss battle simultaneously begins. In the boss battle, the target flashes. When a token discharged from the discharging unit hits the flashing target, the "boss" (strong character) displayed on the display unit 20 is attacked in such video game. The hit/miss of tokens of each satellite is reflected as data for the video game of the other satellites. In other words, the couple respectively playing the same token game device at the satellite will cooperate to defeat the "boss". The shooting results are recorded for each satellite and, if the player is able to defeat the "boss," a picture of tokens is displayed on the display unit in accordance with such results. By collecting the tokens with the lever, the collected number of tokens are paid out to the player. Energy is further added in accordance with the results of the boss battle. After the boss battle is finished, the token game device returns to the ordinary game processing.

At the satellite in which the energy points have exceeded a prescribed value, jackpot processing is performed. In jackpot processing, tokens are paid out from the hopper of the main body 41 and enter the target 3. When the tokens enter the target 3, a new video game begins on the display unit 20, and the game develops so as to defeat the new "boss". When a prescribed number of tokens hit the target, tokens corresponding to a bonus are paid out to the player, and the game of such satellite is finished.

Specific Processing

Figure 7:
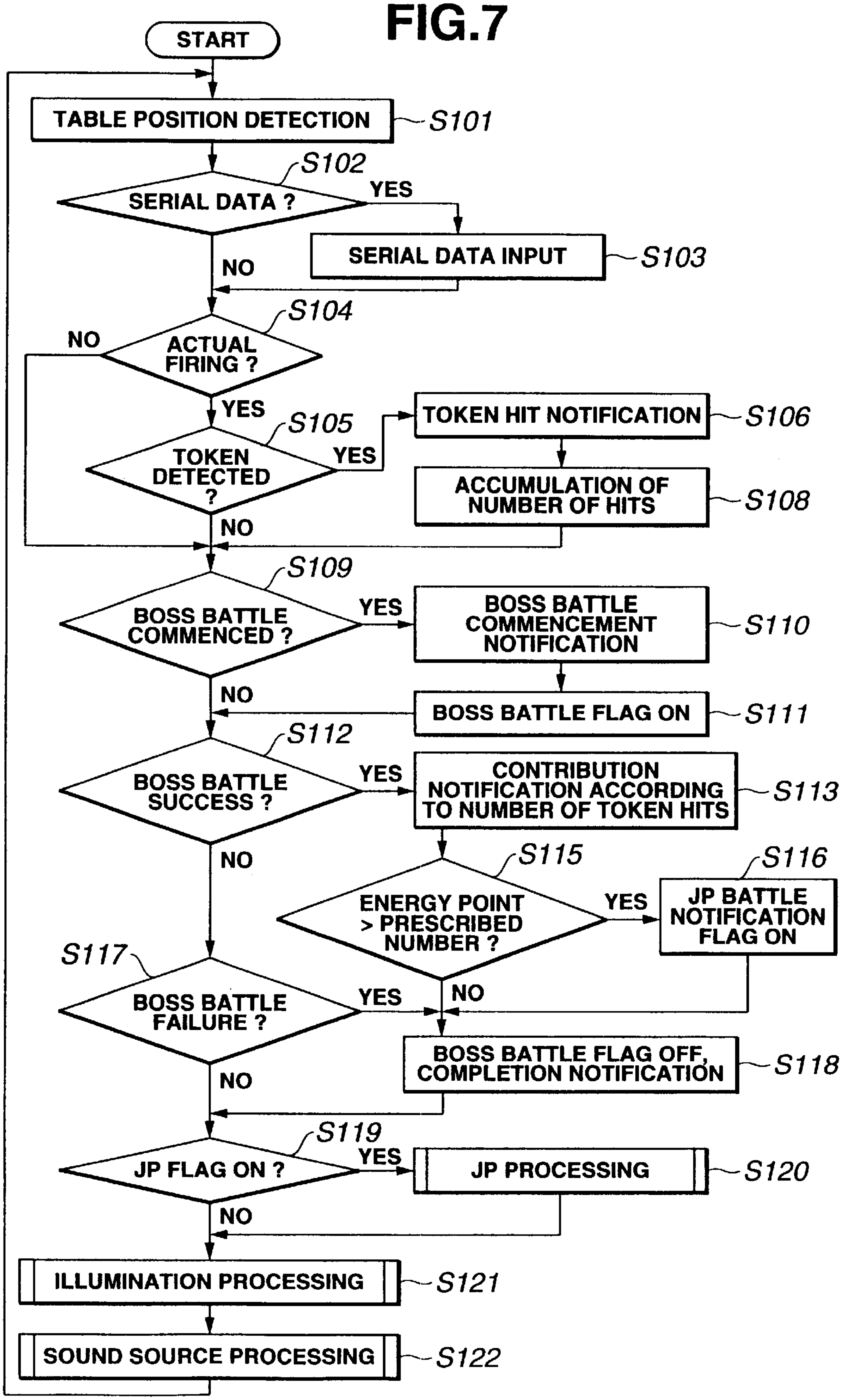
FIG. 7 is a flowchart explaining the processing in the main unit.
Figure 8:
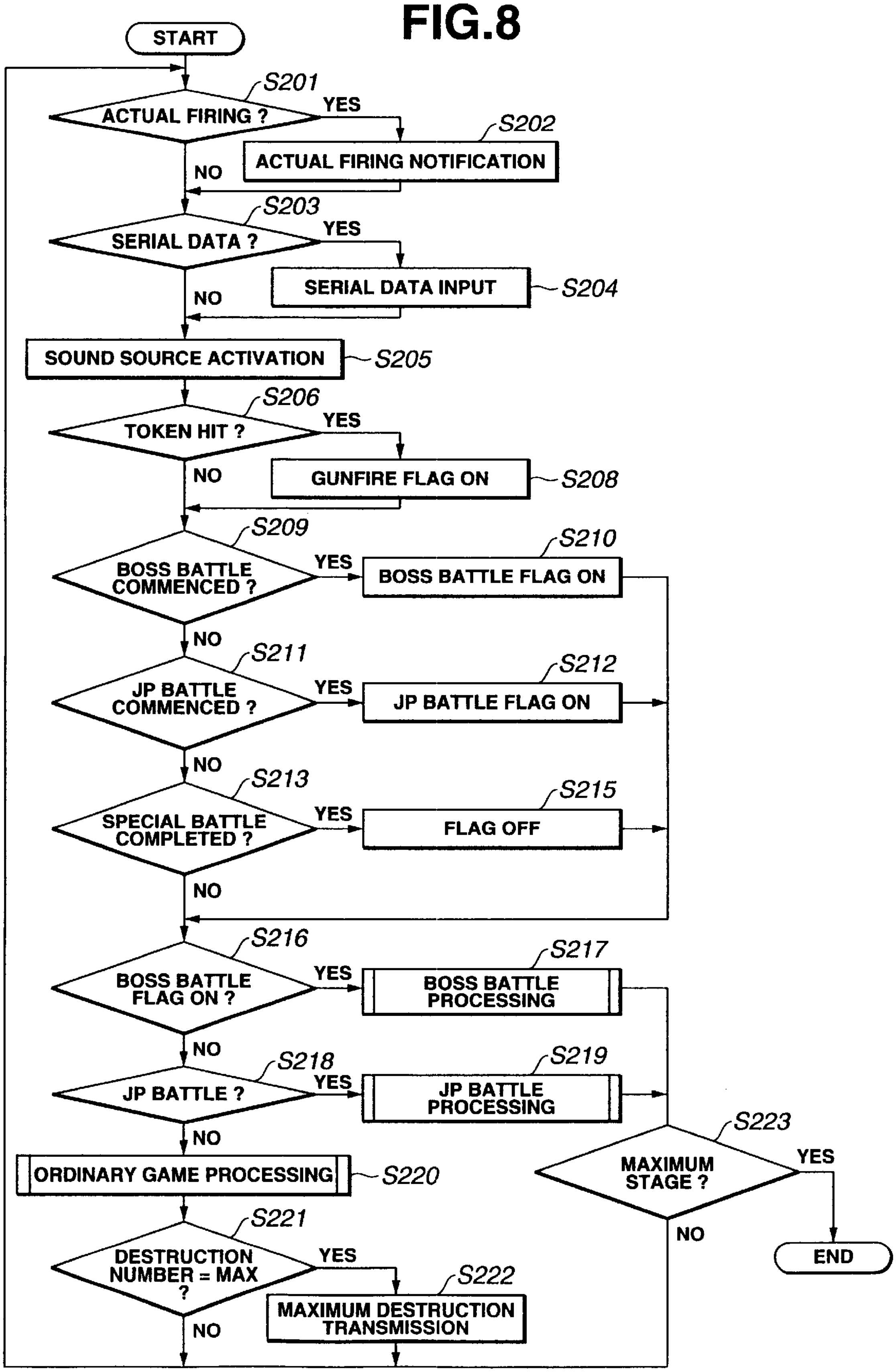
FIG. 8 is a flowchart explaining the processing in the satellite unit.

The specific processing flow of each unit is now explained pursuant to the relevant flowcharts. FIG. 7 shows the processing to be executed by the main unit 100, and FIG. 8 shows the processing to be executed by the respective satellite units 200.

The main unit 100 and the satellite unit 200 mutually notify status to each other to make the game progress in conformity. Several notifications are made in gunfire units or game units. For example, as the satellite unit detects the discharge of tokens, such discharge is conveyed to the main unit. As the main unit detects whether the token hit the target, such hit is conveyed to the satellite unit and the processing of the video game is altered thereby. Game modes such as the start of the boss battle and jackpot battle are also mutually informed. By this two-way communication, a single game control is conducted as a whole. In comparison to processing steps including the satellite by task sharing with one computer, the aforementioned distributed processing allows quick and efficient processing.

Upon starting the game, the player may set the strength of the character displayed on the display unit 20. The satellite unit 200 stores this setting. In accordance with the strength of the character, energy points to be added and the number of tokens to be paid out are determined.

The main unit 100 and satellite unit 200 judge the present game mode with a f lag during loop processing. Alteration of the game mode and firing/non-firing of bullets are communicated by a command. When a command is transmitted, the corresponding flag is altered, and the mutual game progress in the units is made to be in conformity. Initially, together with a gunfire flag for recording gunfire, a boss battle flag and a JP (jackpot) battle flag for determining the game mode are also reset. Thus, the game begins from the ordinary game processing.

The main unit foremost detects the rotation angle of the turntable 5 in correspondence with the detection signals from the position sensor 503 (S101) in order to grasp the corresponding relationship between the plurality of targets 3 and the respective satellites 2. Supplied to the satellite unit are detection signals from the trigger sensor of discharging unit 8A or 8B, and the satellite unit judges that a valid token was actually discharged when additional detection signals are supplied from the token sensor 214 within a prescribed period of time (S201; YES). This is in consideration of cases when a token is not actually discharged even when the trigger 82 is pulled as the tokens are blocked, etc. When the satellite unit judges that an actual firing was made, it notifies to the main unit via the interface circuit 203 of the fact that an actual firing was made (S202).

Both units are judged during the loop processing with respect to whether serial data has been transmitted (S102, S203). When it is judged that serial data exists in the ring buffer accumulated by the interrupt processing from the buffer of the interface circuit (S102, S203; YES), both units read the serial data (S103, S204). When an actual firing is made, the satellite unit activates the sound source circuit 205 and transmits the discharging sound thereof from the speaker 26. When sound source control signals have been transmitted from the main unit, the satellite unit activates the sound source circuit in accordance with the command thereof. This is because even if background music is synthesized with the discharging sound from the speaker 26, it will have no influence on the player's operation.

When an actual firing is notified from the satellite unit (S104; YES), the main unit detects whether a token hit any of the targets 3 opposing this satellite 2 within a prescribed period of time (S105). And when the sensor 301 of the target unit 300 detects that a token hit such target (S105; YES), the main unit notifies this hit to the satellite unit (S106), and records the number of token hits of this satellite in the game state.

When the satellite unit is notified of the token hit (S206; YES), it sets a gunfire flag (S208) to be used in the respective game mode processing steps (S217, S219, S220). Then, the boss battle flag is foremost reset (S209; NO), the JP battle flag is reset (S211; NO, S218; NO) and, as the completion of such special battles have not been notified (S213; NO), the ordinary game processing is executed (S220). As the notification of the boss battle or the setting of the boss battle flag has not been made (S109; NO, S112; NO, S117; NO) and the JP battle flag has not been set (S119; NO) to the main unit, ordinary illumination processing (S121) and sound source processing (S122) are executed. Thereby, the target is illuminated and the background music of an ordinary game processing is transmitted from the speaker 17 pursuant to the sound source circuit 107.

Ordinary Game Processing

Figure 9:
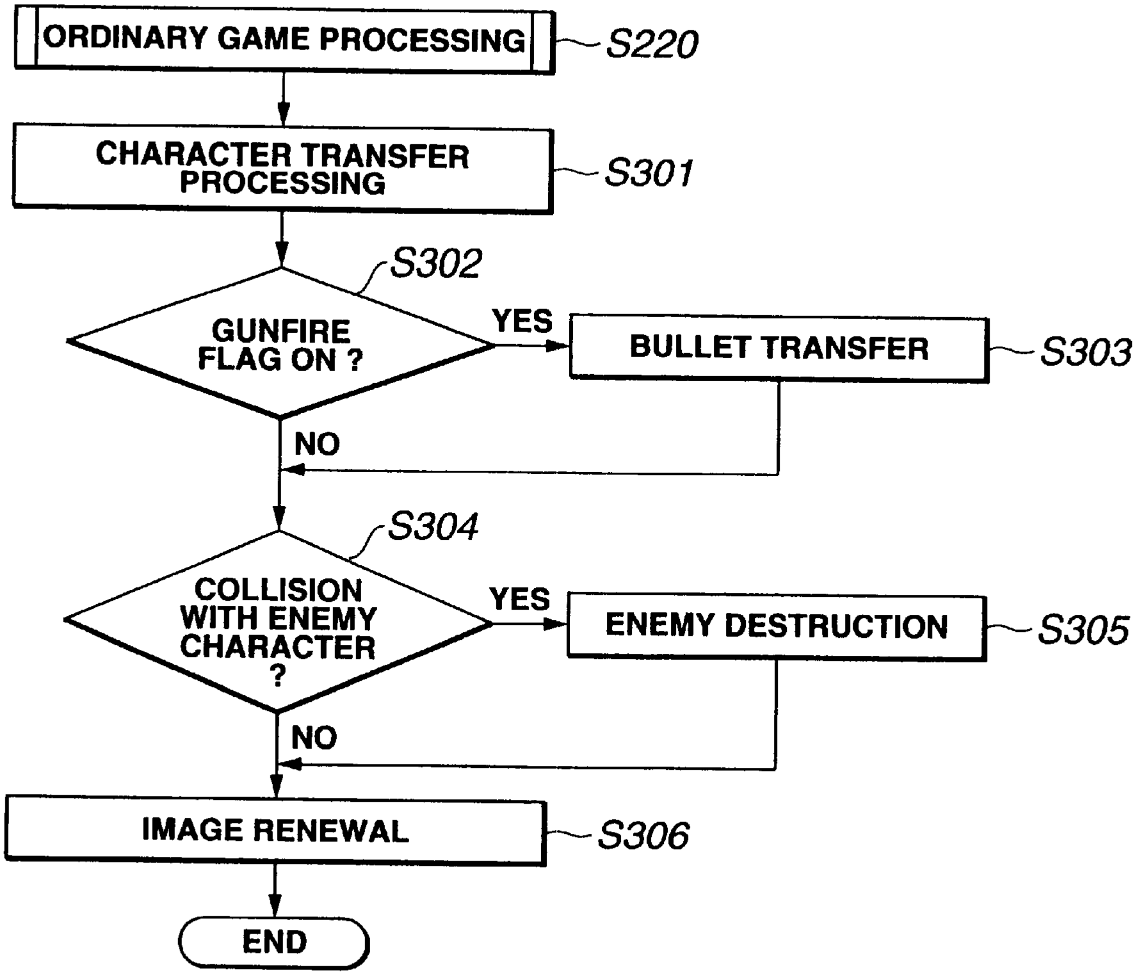
FIG. 9 is a flowchart explaining an ordinary game processing.

FIG. 9 shows the ordinary game processing steps in the satellite unit. In order to facilitate the understanding of the processing loop according to the present embodiment, a single ordinary game processing is executed per loop, although it is actually processed in image renewal period (frame period) units. The CPU 201 executes a video game program from the time power is turned on, and some kind of video game image is generated by the video display circuit 207 and a video game image is displayed on the display unit 20. The satellite unit is capable of displaying a prescribed object (an object moving on the screen in correspondence with a program or operation is hereinafter referred to as "character") in front of the background image. A character to be operated by a player thereafter (hereinafter referred to as "operational character") is displayed from the beginning. When gunfire begins, an enemy character (hereinafter referred to as "enemy character") which becomes the target of the shooting is displayed. When such characters are displayed at the beginning of the ordinary game processing, the CPU 201 calculates the coordinates of their destination (S301). When a gunfire flag is set (S302; YES), the CPU sets the arrangement of the objects such that a character representing a bullet (hereinafter referred to as "bullet") is discharged from the operational character, and resets the gunfire flag (S303). If processing for moving the bullet is performed for each image renewal period, displayed is an image as though bullets are being fired from the operational character. If any of these bullets hit the enemy character (S304; YES), the CPU eliminates such enemy character (S305). For example, the CPU makes a plurality of enemy characters appear simultaneously, and when all characters are destroyed, makes other types of enemy characters appear. When several types of enemy characters have all been destroyed, the CPU makes a special character appear which represents the enemy character base. When this special character is destroyed, the CPU calculates the number of bases destroyed. Finally, the video display circuit 207 generates image data for displaying the characters at the destination determined by the CPU with respect to the respective characters, synchronizes this with the image renewal period, and outputs this to the display unit 20 (S306). By this processing, displayed is a character in which the display position gradually changes in frame units, and it is possible to make the player recognize that it is a moving image.

Boss-Battle Processing

When the number of bases destroyed after the completion of a single ordinary game processing (S220) has reached a maximum number (10 for example) (S221; YES), the satellite unit notifies this to the main unit (S222). The main unit judges that a boss battle has commenced in one of the satellites (S109; YES) pursuant to the notification input as serial data (S103). The main unit then sends a command for starting the boss battle in all satellite units (S110), and sets the boss battle flag for internal processing (S111). When the boss battle flag is set, the main unit makes the cold-cathode tube 303 of the target flash. The main unit alters the processing so that the notification of a token hit (S106) is made only when a token discharged from the discharging unit hits the target while the cold-cathode tube is flashing.

Every satellite unit that receives the boss battle command recognizes such command f or starting the boss battle (S209; YES), and sets the boss battle flag for internal processing (S210). Since the boss battle flag is set (S216; YES), the CPU 201 proceeds to the boss battle processing (S217).

Figure 10:
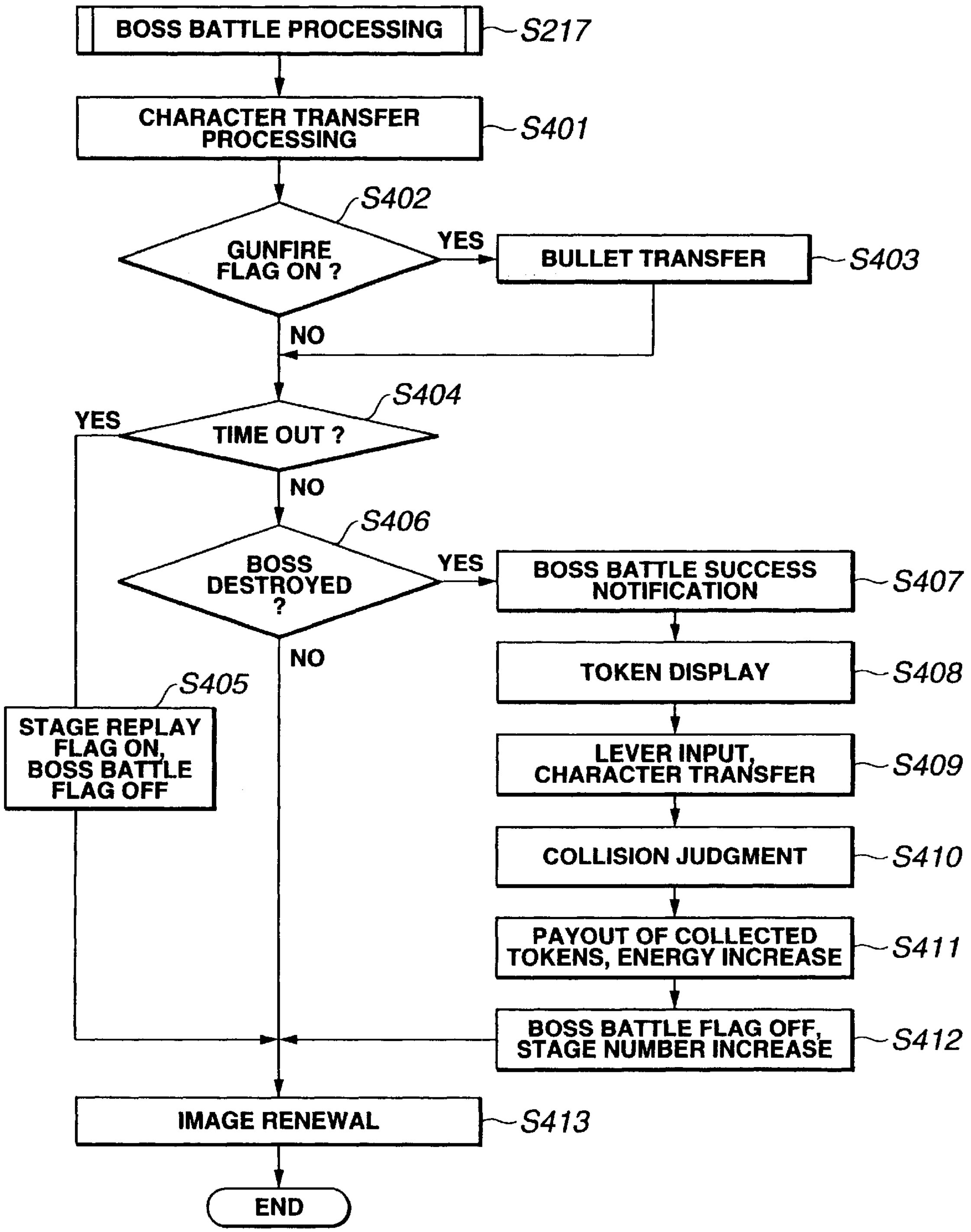
FIG. 10 is a flowchart explaining the boss battle processing.

FIG. 10 shows the boss battle processing steps executed at the satellite units. In order to facilitate the understanding of the processing loop according to the present embodiment, a single boss battle processing is executed per loop, although it is actually processed in image renewal period (frame period) units. As with the ordinary game processing, an operational character is displayed in the boss battle processing. Furthermore, an enemy character (hereinafter referred to as "boss character") which moves and becomes the target of shooting is displayed pursuant to the program. The CPU 201 calculates in advance the coordinates of the destination of such characters per image renewal period (S401).

In order to discharge bullets from the operational character to defeat the boss character in the video game, the player operates the discharging unit 8A or 8B and discharges tokens toward the flashing target 3. The main unit notifies the token hit only when tokens hit the target while the cold-cathode tube is flashing. As the gunfire flag is set when the token hit is notified (S208), the satellite unit moves the bullet as with the ordinary game processing when the gunfire flag is set (S402; YES). Here, the setting may be such that the main unit commonly supplies the gunfire situation in the other satellites to the respective satellites. If a plurality of operational characters are simultaneously displayed and bullets are discharged from the respective operational characters in accordance with the gunfire situation, it is possible to provide a player with an actual feeling that every satellite is cooperating to defeat the boss character.

When the boss character could not be defeated within a predetermined time (S404; YES), the CPU 201 sets a stage replay flag for proceeding to the ordinary game processing, resets the boss battle flag, and notifies the main unit that the boss battle was a failure (S405). The main unit detects the above (S117; YES), resets the boss battle flag and simultaneously transmits a command to every satellite for ending the boss battle (S118). The satellite unit recognizes that the boss battle has ended upon receiving this command (S213; YES), and resets the boss battle flag (S215). The token game device returns to the ordinary game processing pursuant to the flag being reset.

On the other hand, if a condition is satisfied within a predetermined period of time S404; NO) for destroying the boss character in the satellite unit (a certain number of bullets hit the boss character for example) (S406; YES), the victory in the boss battle is notified to the main unit (S407). When the main unit recognizes the boss battle victory (S112; YES), it notifies the satellite unit of the number of tokens which hit the target and which was stored in correspondence with the satellite unit (S113). In other words, the main unit notifies the contribution of the respective satellites in the boss battle. In the satellite unit, the CPU 201 displays on the display unit 20 characters representing the tokens corresponding to the contribution of the satellite (hereinafter referred to as "token character") notified from the main unit (S408). Simultaneously, the CPU permits the input from the lever 23 and prompts the player to operate the lever by displaying a message or providing voice guidance. When the player operates the lever 23, the CPU moves the character in correspondence with the player's operation (S409). The CPU then judges the collision between the operational character and token character, and when it judges that they have collided, eliminates the token character (S410). Thereafter, the CPU activates the hopper 25 to pay out actual tokens in a number corresponding to the number of eliminated token characters, and increases the energy points (S411). As flying token characters are displayed on the display unit 20 in accordance with the player's contribution, and the number of collected tokens corresponding to the number of eliminated characters is actually paid out from the payout return 21 directly under the display unit, it is possible to provide the player with an illusion that he/she has actually grabbed the flying tokens. Higher the contribution of the satellite, higher the number of token characters to be displayed. By appropriately operating the lever, it is possible to provide the player with the number of tokens in accordance with the degree of his/her contribution. Finally, the boss battle flag is turned off, and the stage number is increased so as to begin the next processing in the ordinary game processing (S412). When image data generation and output processing for image renewal are performed (S413), the boss battle processing is finished.

Jackpot Processing

For each boss battle victory, energy points are accumulated per satellite (S413). Such energy points are notified to the main unit at all times. When the energy points of any satellite in the main unit exceed a prescribed number (S115; YES), the start of a jackpot (JP) battle is notified to the corresponding satellite and the JP flag is set (S116). If the JP flag is set (S119; YES), JP processing is conducted at the main unit (S120). When the JP battle is notified (S211; YES), a JP flag is set at the satellite unit (S215) and, when the JP flag is set (S218; YES), JP processing is performed (S219).

Figure 11:
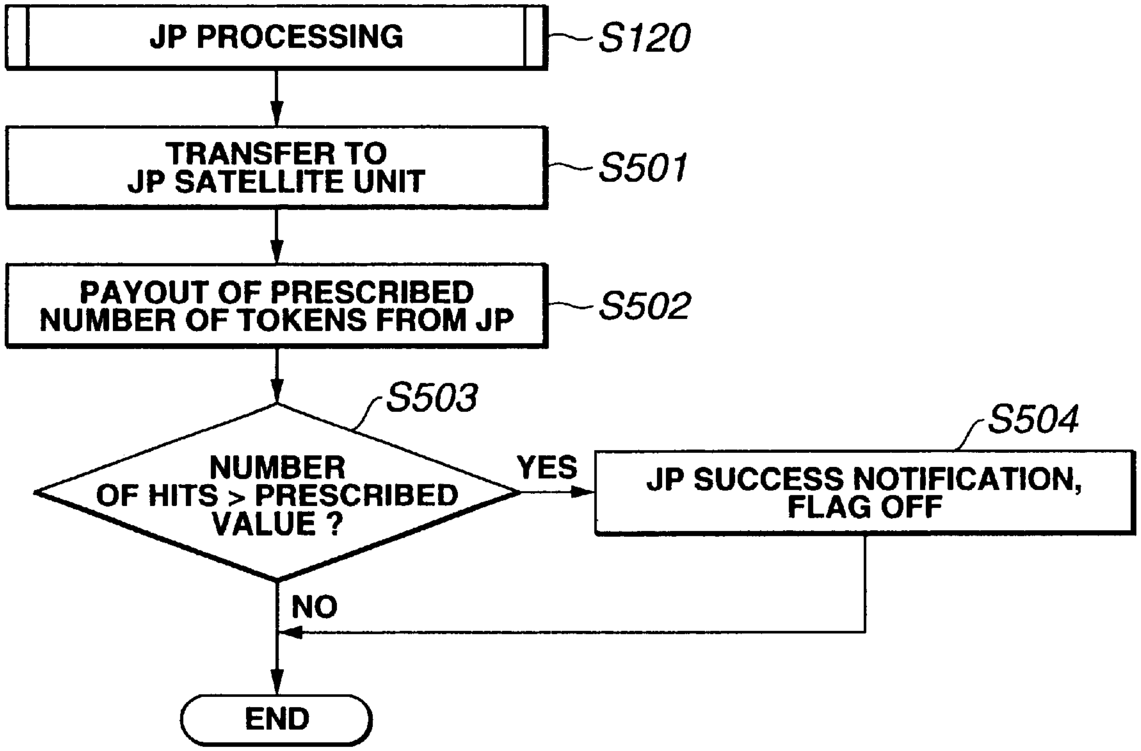
FIG. 11 is a flowchart explaining the jackpot processing in the main unit.
Figure 12:
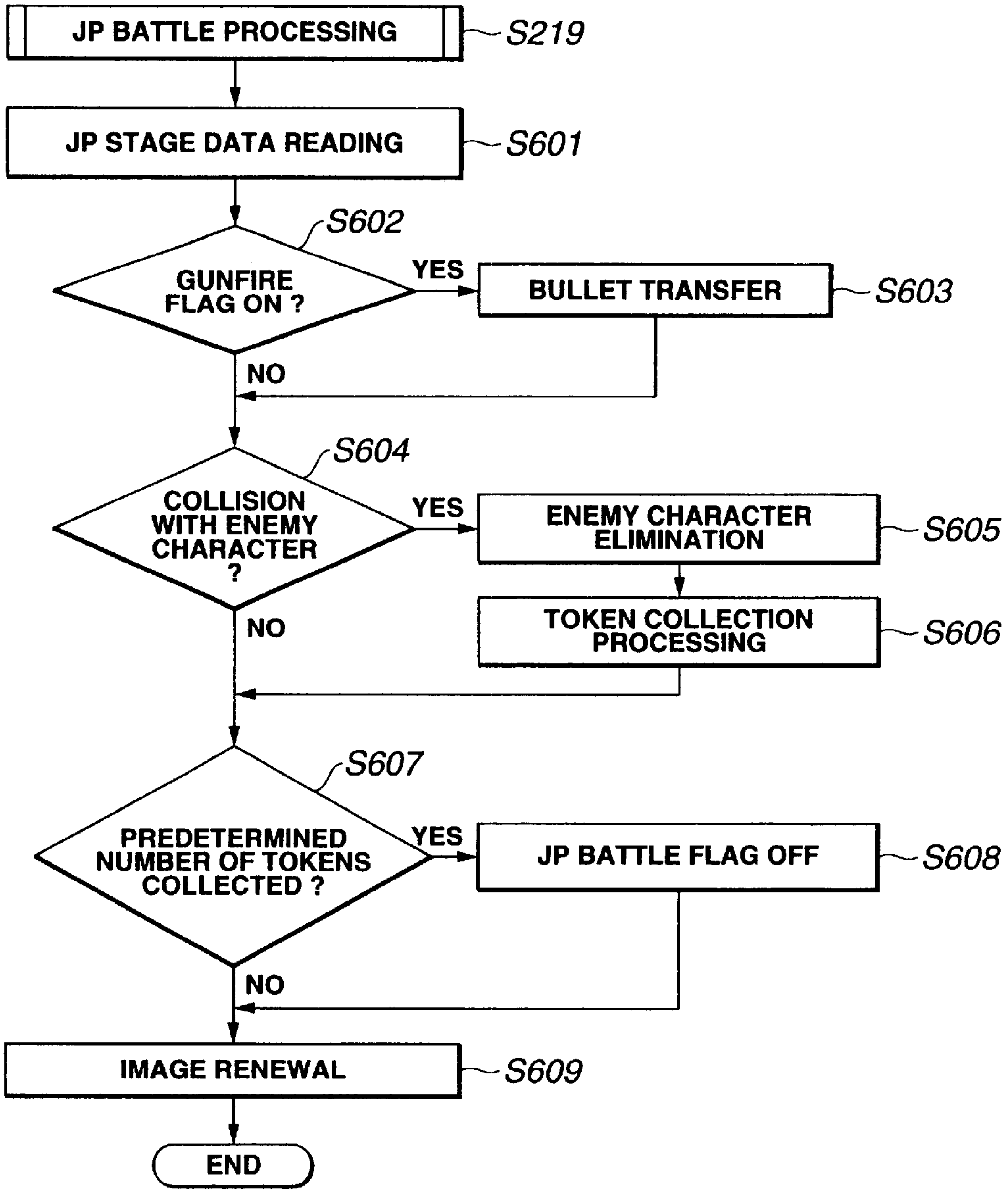
FIG. 12 is a flowchart explaining the jackpot processing in the satellite unit.

FIG. 11 shows the JP processing (S120) of the main unit and FIG. 12 shows the JP battle processing (S219) steps of the satellite unit. In the main unit, foremost, the token payout opening of the jackpot 4 is moved in front of the satellite, which is the subject of such JP battle, pursuant to the detection signals of the JP sensor 502 (S501). Then, a prescribed number of tokens are paid out from the jackpot 4 (S502). When the paid out tokens hit the target 3 (FIG. 7; S105; YES), such token hit is notified (S106). Here, the operation of the discharge unit is not judged in the JP battle (S104). In the satellite unit, the CPU 201 prepares the image data for the JP battle (S601). And when a token enters the target and the gunfire flag is set (S206; S208; S602; YES), the CPU displays a bullet on the display unit as mentioned above and performs transfer processing (S603). When a prescribed number of bullets hit the enemy character (S604; YES), the CPU eliminates the enemy character (S605) and performs token collection processing similar to steps S407 through S411. Since a jackpot is a special prize, numerous token characters are displayed and, if the player persists in the game, he/she may actually win many tokens.

In the main unit, when the number of tokens that hit the target exceeds a prescribed number (S503; YES), it notifies the success of the JP battle to the satellite and resets the JP battle flag (S504), and returns to loop processing. In the satellite unit, when the success in the JP battle is notified (S607; YES), the CPU 201 resets the JP battle flag (S608), performs image renewal processing (S609), and returns to loop processing. When the final stage of the satellite is reached (FIG. 8; S223; YES) in an ordinary game processing, the CPU 201 ends the game processing in such satellite.

Advantages

According to the aforementioned embodiment, the following advantages may be achieved:

(1) According to the present embodiment, while the player is concentrating on the token game, a video game is executed on the display unit on its own (by CPU processing). Thus, the operation for collecting tokens is possible at the stage when it is no longer necessary to operate the discharging unit for winning the boss battle or JP battle. Accordingly, it is possible to sufficiently entertain token game fans who wish to enjoy various operations as the player may play the game while switching the operation means in succession.

(2) According to the present embodiment, even if a prescribed result is reached in the satellite unit, a few milliseconds of time lag will occur as such result is temporarily notified to the main unit and the main unit transmits the command anew. Thus, as the image displayed on the display unit changes with a slight delay after the player operates the discharging unit, the player may enjoy the changes in the display without his/her operation being hindered hindered.

(3) According to the present embodiment, as two discharging units are provided for each satellite, a couple may enjoy the game together.

(4) According to the present embodiment, as a common front is formed between all satellites upon the boss battle, fellow couples may play the game in cooperation and feel the mutual achievement between the other couples playing the game.

(5) Further, as tokens are paid out in accordance with the player's contribution in the boss battle, it is possible to provide a reward in correspondence with the player's efforts to each satellite.

(6) Moreover, as numerous tokens may not be won unless the player succeeds in both the token shooting game and the collection of token characters with a lever, it is possible to provide an irresistible token game device to players who like various operations.

(7) According to the present embodiment, as the target is formed in an attractive character shape and tokens reaching the center thereof are judges as hits, it is possible to provide a token game device which may be easily accepted by everybody.

(8) According to the present embodiment, as the target is flashed upon the passing of the token being detected, it is possible to directly confirm the token hit.

(9) According to the present embodiment, as the token collection mechanism and token supply mechanism move simultaneously with the target on the turntable, it is possible to supply tokens without having to interrupt the game therefor.

(10) According to the present embodiment, background music is heard from the upper -part of the game device and it is therefore possible to provide enjoyable music to a distance, while discharging sounds may be heard from a position near the player's hand. Accordingly, as well as having the effect of gathering prospective users even if he/she dislikes shooting games, it is possible to individually provide discharging sounds to a degree which will facilitate the player's operation. Furthermore, it is possible to drown out the noises generated by the discharged tokens.

(11) According to the present embodiment, as an ordinary game, boss battle and jackpot battle, which have different characteristics, are commenced without any specific order, it is possible to create an amusing game environment with abundant variations.

Modification Examples

Although the present invention is described in the context of the aforementioned embodiment, it is not limited thereto and may be used in various other applications.

With respect to the token game system, although a token, i.e., a discoid body, was used as the bullet in the present embodiment, it may be other objects such as a ball, block, etc. Furthermore, it may be a bundle of energy or a conceptual object as mentioned above so as long as detection means is provided in accordance with the mode of such bullet. Although the target was made to rotate in the center, it is not limited thereto and may be made to, for example, move back and forth leftward and rightward, or upward and downward, or stay still. As the mode of the game machine, it is not limited to being a mode wherein players aim at the target in the center, and may be any mode such as that the players line up in a row or face each other in two rows, and soon.

With respect to the video game system, although the present embodiment was a shooting game, it may be other video games. The present invention is characterized in that a plurality of different types of games are organically linked. Further, the video game is not limited to being a mode wherein token characters are collected, and may be structured to be a shooting game with a lever operation to pay out tokens in a number corresponding to the results thereof. Moreover, conceptual points may be competed for or a game replay may be provided to the player instead of paying out tokens.

With respect to the machinery system, the shape of the respective token collection containers is not limited to the aforementioned embodiment, and the design may be suitably changed within the scope conforming with the object of the present invention. For example, instead of gathering tokens at a single opening, the game device may be structured to be capable of collecting tokens from a plurality of openings.

Regarding the overall processing, instead of a relationship of video game after token game, for example, the game may progress in the opposite order. Further, instead of distributed processing of the main unit and satellite unit, centralized processing may be employed pursuant to the processing ability of the computer. Moreover, it is not necessary to limit the plurality of satellites forming the cooperation relationship to the satellite in the same token game device. In other words, if the token game devices are provided with a communication function and structured so as to be capable of two-way communication of commands and data via a network, it is possible to execute the game processing according to the present embodiment with satellites or players at a distance. Even if a cooperating player is not nearby, game play with the cooperation of another player is possible.

According to the present invention, as a video game is executed in link with the token game, it is possible to provide a token game device in which the player will not lose interest. Therefore, for those token game fans who want to enjoy the operation of a game, the game will not only commit to providing speculative spirit, but the game itself will also provide an invigorating feeling. Thus, it is possible to maintain the attraction of the player's interest for a long time.

According to the present invention, as the linked token game and video game are respectively structured to be operable, the player may enjoy various operations.

According to the present invention, it is possible to play the game with the cooperation of another player when a prescribed condition is fulfilled in any of the discharging units. Therefore, a sense of unity is generated when a player cooperates with another player, who conventionally was merely a stranger, upon playing the game. An enjoyable communication is thereby generated.

According to the present invention, as it is possible to reliably detect the passing of a token with only one sensor, provided is an inexpensive token detecting mechanism suitable for token games.

According to the present invention, as the token collection mechanism moves simultaneously with the target, provided is a token game device capable of supplying tokens without having to stop the movement of the target even when it is to be moving.

According to the present invention, as the sounding position of the background music and the sounding position of the discharging sound are different, provided is a token game machine with a sound system suitable for both gathering prospective users and for token game play.

We claim:

1. A token game device in which a player attempts to hit a physically defined target with a game token, comprising:

moving means for moving the physically defined target;

processing means for commencing processing of a video game in accordance with whether the hit physically defined target;

alteration means for altering the processing in accordance with the player's operation; and decision means for deciding the prize to be awarded to the player in accordance with processing results of said video game.

2. A token game device in which a player attempts to hit a physically defined target with a game token, comprising:

a discharging unit for discharging a token in accordance with the player's operation;

a physically defined target for detecting the hit of said token;

moving means for moving the physically defined target;

an operation unit to be operated by the player;

a display unit for displaying images of a video game;

a payout unit for paying out to the player tokens corresponding to a prize; and a control unit for generating images for said video game and commencing game processing of the video game when it is judged that the token hit said physically defined target, wherein said control unit alters the game processing in accordance with the player's operation of said operation unit and pays out tokens to the player in accordance with results of said game processing.

3. A token game device according to claim 2, wherein said control unit is capable of executing:

a first game which moves a first object corresponding to a weapon toward a second object corresponding to an enemy when it is judged that a token hit said physically defined target, and which eliminates said second object when it is judged that said first object collided with said second object; and a second game which displays on a screen a third object corresponding to a prize when a prescribed condition is fulfilled in said first game, and which pays out tokens in correspondence with a number of third objects the player was able to collide with his/her operation of a fourth object set to be movable in correspondence with the player's operation.

4. A token game device according to claim 3, wherein said control unit is structured such that the player may alter an expected value for eliminating said second object with his/her operation.

5. A token game device in which a player attempts to hit a physically defined target with a game token, comprising:

a plurality of discharging units respectively operable by the player;

a plurality of display units for displaying images of a video game in correspondence with said discharging units; and a control unit for executing game processing of a video game per discharging unit in accordance with whether the tokens discharged from the respective discharging units hit the physically defined target, wherein, when a condition required for participating in a special game in at least one discharging unit is fulfilled, said control unit simultaneously executes said special game in the other discharging units, and executes said special game processing by combining results of whether the tokens discharged from the respective discharging units hit said physically defined target.

6. A token game device according to claim 5, wherein said control unit displays a same object to the respective display units when executing said special game, and is structured to be mutually reflective to a video game for displaying on the respective display units results of whether the tokens discharged from the respective discharging units hit said physically defined target.

7. A token game device according to claim 5, wherein said control unit stores in correspondence with the respective discharging units the results of whether the tokens hit the physically defined target during the execution of said special game and, upon completion of said special game, decides a prize to be awarded to the player operating the respective discharging units in correspondence with said results stored therein.

8. A token game device in which a player attempts to hit a physically defined target with a game token, comprising:

a plurality of discharging units for discharging tokens in accordance with the player's operation;

at least one physically defined target for detecting the hit of said tokens;

at least one display unit for displaying images of a video game and which corresponds to at least one of said discharging units;

at least one operation unit to be operated by a player and which corresponds to at least one of said discharging units;

at least one payout unit for paying out tokens to a player and which corresponds to at least one of said discharging units; and a control unit for executing game processing of a video game and generating images of said video game per said display unit, wherein said control unit executes a first video game per display unit when it is judged that a token hit said physically defined target; executes a second video game reflective of the operation of said operation unit when processing of said first video game fulfill a prescribed condition; pays out tokens to a player in accordance with processing of said second video game; when a condition required to participate in a special game in at least one of said discharging units is fulfilled, simultaneously executes said special game in the other discharging units; decides processing of said special game by combining results of whether the tokens discharged from said discharging unit hit said physically defined target; and pays out tokens to a player in accordance with his/her contribution to the processing of said special game.

9. A token game device according to any one of claims 2 through 8, wherein said control unit displays an object simulating a token on at least one display unit upon paying out tokens to the player.

10. A token game device according to claim 9, wherein at least one payout unit is arranged so as to be able to pay out tokens from a payout return provided a prescribed distance away from a display face of at least one display unit, and pays out tokens from said payout return in approximate synchronization with a display of at least one object on said display unit.

11. A token game device according to claim 10, wherein said control unit executes the video game such that a period of game play with said discharging unit and at least one of a period of video game and payout of tokens in the video game do not overlap.

12. A token game device according to claim 11, wherein said control unit includes:

a first controller for detecting whether a token hit the physically defined target; and a second controller provided respectively to at least one discharging unit and capable of executing a video game for the respective at least one discharging unit, wherein said first controller and said second controller are capable of two-way communication.

13. A token game device according to claim 10, wherein said control unit includes:

a first controller for detecting whether a token hit the physically defined target; and a second controller provided respectively to at least one discharging unit and capable of executing a video game for the respective at least one discharging unit, wherein said first controller and said second controller are capable of two-way communication.

14. A token game device according to claim 9, wherein said control unit executes the video game such that a period of game play with said discharging unit and at least one of a period of video game and payout of tokens in the video game do not overlap.

15. A token game device according to claim 14, wherein said control unit includes:

a first controller for detecting whether a token hit the physically defined target; and a second controller provided respectively to at least one discharging unit and capable of executing a video game for the respective at least one discharging unit, wherein said first controller and said second controller are capable of two-way communication.

16. A token game device according to claim 9, wherein said control unit includes:

a first controller for detecting whether a token hit the physically defined target; and a second controller provided respectively to at least one discharging unit and capable of executing a video game for the respective at least one discharging unit, wherein said first controller and said second controller are capable of two-way communication.

17. A token game device according to any one of claims 2 through 8, wherein said control unit executes the video game such that a period of game play with at least one discharging unit and at least one of a period of video game and payout of tokens in the video game do not overlap.

18. A token game device according to claim 17, wherein said control unit includes:

a first controller for detecting whether a token hit the physically defined target; and a second controller provided respectively to at least one discharging unit and capable of executing a video game for the respective at least one discharging unit, wherein said first controller and said second are capable of two-way communication.

19. A token game device according to any one of claims 2 through 8, wherein said control unit includes:

a first controller for detecting whether a token hit the physically defined target; and a second controller provided respectively to at least one discharging unit and capable of executing a video game for the respective at least one discharging unit, wherein said first controller and said second controller are capable of two-way communication.

20. A token game device in which a player attempts to hit a target with a game token, comprising:

a collection container for receiving tokens discharged from a periphery toward the target;

a token transportation mechanism for gathering and transporting the tokens discharged into said collection container; and a rotation mechanism for rotating said collection container and token transportation mechanism, wherein said collection container is inclined with respect to a level surface and has a bottom portion provided with a hole at a lowermost portion, and said token transportation mechanism is arranged so as to be able to gather and transport the tokens that are gathered at and dropped from said hole.

* * * * *